(12) United States Patent
Kocagoez

(10) Patent No.: US 10,588,043 B2
(45) Date of Patent: Mar. 10, 2020

(54) BROWNOUT PREVENTION FOR MOBILE DEVICES

(71) Applicant: Intel IP Corporation, Santa Clara, CA (US)

(72) Inventor: Kenan Kocagoez, Nuremberg (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/272,908

(22) Filed: Feb. 11, 2019

(65) Prior Publication Data

US 2019/0335353 A1 Oct. 31, 2019

Related U.S. Application Data

(63) Continuation of application No. 15/966,976, filed on Apr. 30, 2018, now Pat. No. 10,206,134.

(51) Int. Cl.
*H04W 28/02* (2009.01)
*H04W 24/08* (2009.01)
*H04W 52/02* (2009.01)
*H04W 88/02* (2009.01)

(52) U.S. Cl.
CPC ....... *H04W 28/0221* (2013.01); *H04W 24/08* (2013.01); *H04W 52/0251* (2013.01); *H04W 88/02* (2013.01)

(58) Field of Classification Search
CPC ..... H04W 24/08; H04W 28/02; H04W 8/005; H04W 8/26; H04W 40/02; G06F 15/50
See application file for complete search history.

(56) References Cited

U.S. PATENT DOCUMENTS

| | | | |
|---|---|---|---|
| 9,432,298 B1 | 8/2016 | Smith | |
| 2011/0004426 A1* | 1/2011 | Wright | G01R 19/2513 702/61 |
| 2014/0317425 A1 | 10/2014 | Lien et al. | |
| 2016/0196121 A1 | 7/2016 | Baskaran et al. | |
| 2016/0357243 A1* | 12/2016 | Dorsey | G06F 1/3296 |

OTHER PUBLICATIONS

"Introduction of the overheating indication", R2-1712555, 3GPP TSG-RAN WG2 Meeting #100, http://www.3gpp.org/DynaReport/TDocExMtg—R2-100--17086.htm, Nov. 27, Nov. 27, 2017 to Dec. 1, 2017, Reno, Nevada, 2 pages.
"Introduction of the overheating indication", R2-1712557, 3GPP TSG-RAN WG2 Meeting #100, http://www.3gpp.org/DynaReport/TDocExMtg—R2-100--17086.htm, Nov. 27, Nov. 27, 2017 to Dec. 1, 2017, Reno, Nevada, 40 pages.

(Continued)

*Primary Examiner* — Diane D Mizrahi
(74) *Attorney, Agent, or Firm* — Alliance IP, LLC

(57) ABSTRACT

In one embodiment, an apparatus of a mobile device includes memory comprising instructions and processing circuitry coupled to the memory to implement the instructions to: process messages from a network device indicating a scheduling of network traffic for the mobile device, determine an estimated peak power consumption associated with the scheduling of network traffic based on the messages, and execute a time-based throttling scheme for a modem of the mobile device based on the estimated peak power consumption.

18 Claims, 11 Drawing Sheets

(56) References Cited

OTHER PUBLICATIONS

"Introduction of the temporary UE capability for overheating indication", R2-1712556, 3GPP TSG-RAN WG2 Meeting #100, http://www.3gpp.org/DynaReport/TDocExMtg--R2-100—17086.htm, Nov. 27, Nov. 27, to Dec. 1, 2017, Reno, Nevada, 2 pages.

"Stage 2 text for UE overheating", R2-1712399, 3GPP TSG-RAN WG2 #100, http://www.3gpp.org/DynaReport/TDocExMtg—R2-100—17086.htm, Nov. 27, Nov. 27, 2017 to Dec. 1, 2017, Reno, Nevada, 2 pages.

* cited by examiner

US 10,588,043 B2

BROWNOUT PREVENTION FOR MOBILE DEVICES

CROSS-REFERENCE TO RELATED APPLICATIONS

This application is a continuation of U.S. application Ser. No. 15/966,976, filed Apr. 30, 2018. The disclosure of the prior application is considered part of (and is incorporated by reference in) the disclosure of this application.

TECHNICAL FIELD

Embodiments described herein generally relate to power management, and more particularly to thermal management and brownout prevention in mobile devices.

BACKGROUND

Enhancements in mobile wireless communication will continue to push power and thermal boundaries of mobile devices. One challenge in power management includes power delivery in the presence of high power use cases (e.g., elevated processing resources needed or camera flash) as well as high frequency switching times between uplink transmission and downlink reception (e.g. UL/DL slot structure of 5G). Some mobile devices may include thermal management or throttling processes that monitor temperature sensors on chip and trigger throttling measures or notify a radio base station about thermal issues. However, such throttling processes may be reactive rather than proactive, which may lead to brownouts (e.g., an unexpected device shutdown due to supply voltage drops from sudden increased power consumption in the device). In addition, the on-chip temperature sensors may consume important chip space that could be used for other purposes (e.g., to include additional processing resources) or removed from a chip design (e.g., to reduce the device's physical footprint). These issues will become a major challenge for new designs, such as 5G mmWave technologies, that further increase demand on peak power delivery.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
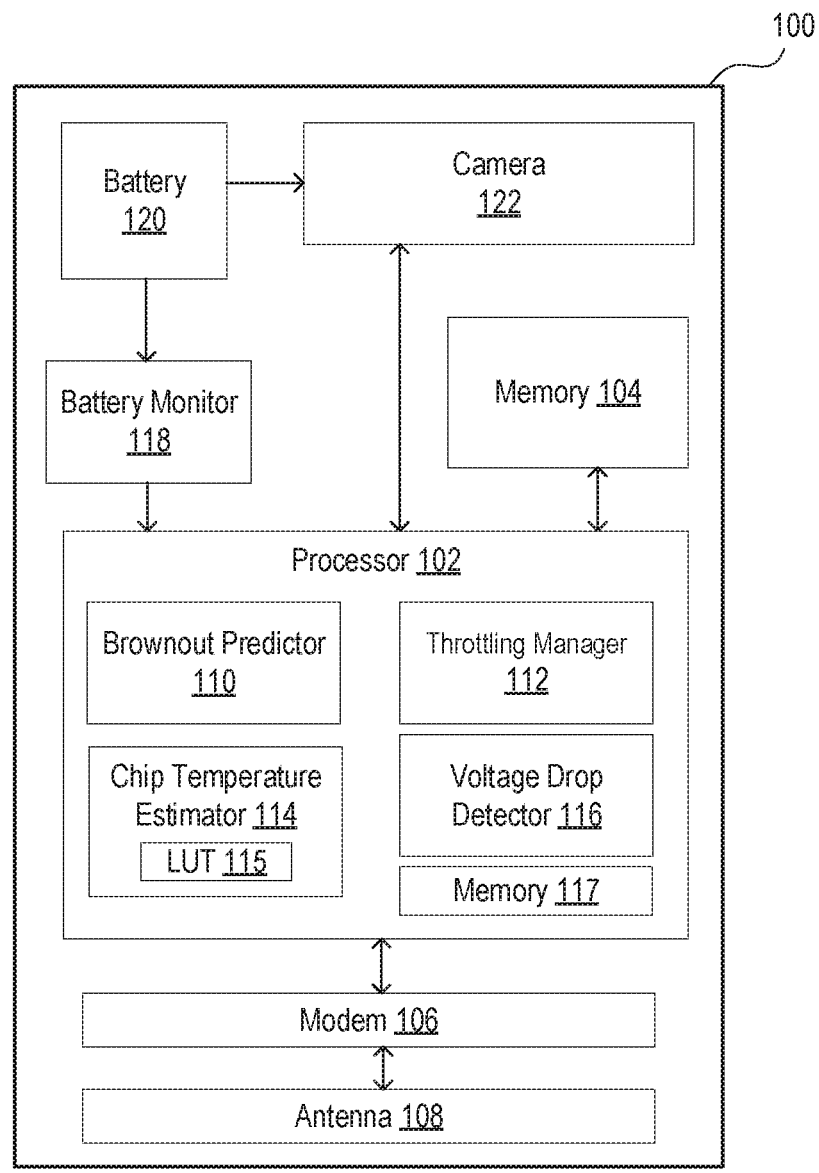
FIG. 1 is a simplified block diagram of an example mobile device according to one embodiment.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

FIG. 1 is a simplified block diagram of an example mobile device 100 according to one embodiment. The mobile device 100 includes a processor 102 (e.g., a central processing unit (CPU), application processing unit (APU), another type of data processing apparatus, or a combination thereof), memory 104 (e.g., random access memory (RAM) or another type of memory or computer-readable medium), a modem 106 (e.g., for communication over a 3G, 4G, 5G, or another type of cellular communication network), and an antenna 108.

The example processor 102 includes processing circuitry for executing instructions, for example, instructions to execute a time-based throttling scheme as described further herein. The processing circuitry can include one or more processor blocks to implement the functions described herein. In the example shown, the processor 102 includes a brownout predictor 110, a throttling manager 112, a chip temperature estimator 114 with one or more lookup tables 115, a voltage drop detector 116, and memory 117 (e.g., read only memory (ROM)). Each of the brownout predictor 110, the throttling manager 112, the chip temperature estimator 114, and the voltage drop detector 116 may be implemented in hardware circuitry, firmware, software, or a combination thereof. The memory 117 may store instructions for execution by the processing circuitry of the processor 102, which may include programs, codes, scripts, or other types of data for execution by the processing circuitry of the processor 102. Additionally, or alternatively, the instructions can be encoded as pre-programmed or re-programmable logic circuits, logic gates, or other types of hardware or firmware components. The processor 102 may be or include a general-purpose microprocessor, as a specialized co-processor or another type of data processing apparatus. In some cases, the processor 102 may be configured to execute or interpret software, scripts, programs, functions, executables, or other instructions stored in the memory 104. In some instances, the processor 102 includes multiple processors or data processing apparatuses.

The example memory 104 includes one or more computer-readable media for storing data. The memory 104 may include a volatile memory device, a non-volatile memory device, or a combination thereof. The memory 104 can include one or more read-only memory devices, random-access memory devices, buffer memory devices, or a combination of these and other types of memory devices. The memory 104 may store instructions (e.g., programs, codes, scripts, or other types of executable instructions) that are executable by the processor 102.

The modem 106 includes circuitry for implementing communications via the antenna 108. In some cases, for example, the modem 106 includes a baseband processor, radio integrated circuit, and a front end module. The communications circuitry may be coupled to the antenna 108, which generates RF or other wireless signals for transmitting or receiving communications. In some cases, the antenna 108 includes multiple antennae, such as, for example, a first antenna for communicating via a first communication protocol (e.g., a 4G protocol, such as the Long Term Evolution (LTE) protocol) and a second antenna for communicating via a second communication protocol (e.g., a 5G protocol, such as the New Radio (NR) protocol).

In some embodiments, the brownout predictor 110 may gather information from the modem 106, (e.g., from the baseband processor), the chip temperature estimator 114, the voltage drop detector 116, the battery monitor 118, or other sources within the mobile device 100, and may use the information to determine whether a brownout is likely to occur and make a brownout prediction accordingly. In some cases, the brownout predictor 110 may determine an estimated peak power consumption for the modem 106. Based on the estimated peak power consumption, the brownout predictor 110 may determine that a brownout scenario is likely and may accordingly send a message to the throttling manager 112 indicating the predicted brownout scenario.

In some instances, a brownout prediction may be made based on a comparison of recently gathered network scheduling information with previously gathered network scheduling information. For example, the brownout predictor 110 may compare NR or LTE downlink and uplink scheduling grants with previous frames. A relatively large difference between the current and previous scheduling grants may indicate a potential brownout, since additional scheduling grants may indicate the need for additional modem resources to implement the higher modem data throughput allowed by the grants.

In addition, battery information may be used by the brownout predictor 110 to make a brownout prediction. The battery monitor 118 may monitor a status of the battery 120 of the mobile device 100 and report the battery information to the brownout predictor 110. In some cases, for example, the battery monitor 118 may monitor a current battery capacity, a battery aging status, a battery temperature, or another characteristic of the battery 120. The battery monitor 118 may monitor the characteristics of the battery 120 in any suitable manner, such as, for example, by measuring electrical characteristics of the battery 120 (e.g., current, voltage, etc.). The brownout predictor 110 may use the information from the battery monitor 118 to make a brownout prediction. For instance, in some cases, a battery capacity level may be used to characterize scheduling grant history for brownout prediction, since low battery capacity levels may increase battery internal resistance and thus modem brownout potential (since the increased internal resistance causes increased voltage drops for the same current draw by the passive circuit devices in the modem, preventing sufficient power from being provided to the system). As another example, the brownout predictor 110 may look at battery aging information or battery temperature information, since increased age and temperature may similarly increase the internal resistance of the battery and thus brownout potential.

In some embodiments, the brownout predictor 110 may analyze network scheduling messages sent to the mobile device 100 by a network device such as a basestation device (e.g., an eNodeB (eNB) device) or another type of network device that manages cellular network scheduling, and use information from the messages to make a brownout prediction. The messages may include Radio Resource Control (RRC) messages (e.g., for adding secondary component carriers), uplink scheduling messages, downlink scheduling messages, or other types of messages indicating a scheduling of network traffic for the mobile device 100. In some cases, the messages may indicate or call for a change in the state of the modem 106, an increase or decrease in the number of component carriers to be used by the mobile device 100 for communication with the network device, or other types of changes to be made by the modem 106 based on the scheduling.

Figure 6:
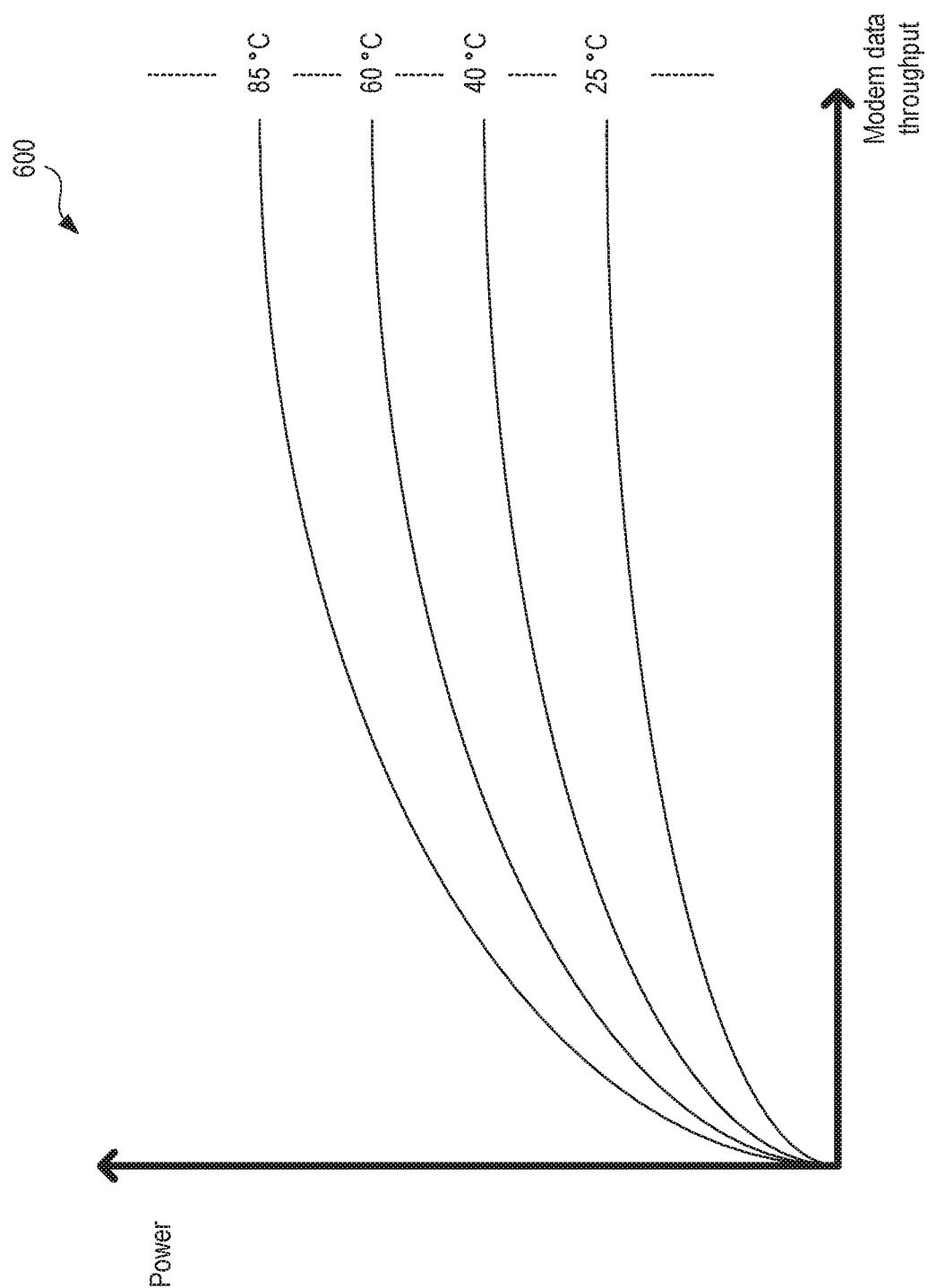
FIG. 6 is a chart of example characteristic curves for various modem chip temperatures according to one embodiment.

The throttling manager 112 may execute a time-based throttling scheme based on a brownout prediction generated by the brownout predictor 110 to prevent the potential brownout from occurring. The scheme may be a tiered scheme with a reversed gradual order of throttling. Each tier may implement a different throttling level based on an amount of time that has elapsed since executing the throttling scheme. In some cases, the throttling scheme may begin with a relatively high level of throttling for a duration of time and including subsequent, lower levels of throttling for respective durations of time (e.g., as shown in FIG. 6, wherein a less restrictive throttling is applied for each subsequent time duration). The throttling manager 112 may execute the throttling scheme by performing one or more of: reducing a data rate for the modem, reducing a number of component carriers available to the modem for communication, reducing a rank indication for the modem, or reducing a window size for a Transmission Control Protocol (TCP). Reducing a window size may be implemented by the following pseudocode:

```
If brownout_detected
   tcpWindowStepSize =SlowRateIncrease( );
else
   tcpWindowStepSize =StandardRateIncrease( );
```

The mobile device 100 further includes a camera 122. The camera 122 may include one or more flash mechanisms, which may require substantial amounts of current in a short amount of time. Because of this, the camera flash may cause supply voltage drops in the modem 106 or other components of the mobile device 100, potentially leading to a brownout scenario. Accordingly, the brownout predictor 110 may utilize information about use of the camera 122 in making a brownout prediction.

In this manner, potential brownout scenarios may be detected and mitigated in advance. Instead of allowing a data throughput of a modem to increase suddenly, potentially causing brownout scenarios, a tailored application of time-based, reversed order throttling management can be used to slowly increase the data throughput of a modem while avoiding a potential brownout. Furthermore, brownout prediction can run independently from other mitigation methods such as thermal-based throttling, voltage drop-based throttling, or TCP windowing. For instance, in some cases, the brownout predictor 110 may issue a brownout warning that allows product-dependent throttling schemes to be implemented.

In some embodiments, the throttling manager 112 may execute a throttling scheme based on an estimated chip temperature, detected supply voltage drops, or both. The estimated chip temperature may be determined by the chip temperature estimator 114, and may be used in place of a traditional temperature sensor (which may take up substantial space on a modem chip). The chip temperature estimator 114 may estimate the temperature of the modem 106 based on characteristic curves for the modem. The characteristic curves may relate modem activity (power, data, carriers etc.) with an expected temperature. Information from the characteristic curves may be stored in a lookup table 115, which may be used by the chip temperature estimator 114 to estimate the modem chip temperature. Drops in supply voltage may be detected by the voltage drop detector 116, which monitors the supply voltage level of the modem. The voltage drops may be caused by a phenomenon whereby the supplied energy of a voltage source (e.g., the battery 120) is reduced as current travels through passive elements of a circuit.

Multiple information sources may be used by the chip temperature estimator 114 to estimate the temperature in real time or near real time. In some cases, for instance, the chip temperature estimator 114 may learn characteristic curves for the device (e.g., to capture process window variations in device physical/electrical characteristics) and store information about the characteristic curves in the lookup table 115 for later use. The characteristic curves for the modem 106 may be based on multiple modem parameters, such as, for example: (1) modem data rate and current/power, (2) modem data rate, current and a reference temperature, or (3) modem state, power, and reference temperature. Monitoring the modem state may provide a more granular data point than a processor state (e.g., CPU state). By learning characteristic curves at a given reference temperature, the temperature estimation process may be more accurate as leakage information will be included. For example, given the modem state along with a modem data rate, changes in the expected power measurement may be due to changes in leakage power, which may vary based on a temperature of the modem. The estimated chip temperature may then be used to make a throttling determination, as described further below.

The voltage drop detector 116 may monitor a number of supply voltage drops that occur over a particular time duration. In addition, the voltage drop detector 116 may monitor device behavior associated with observed supply voltage drops, and learn the patterns. The supply voltage drop information may then be used to make a throttling determination, as described further below. In some cases, a throttling determination may be made using both the supply voltage drop information and the estimated chip temperature (e.g., as shown in FIG. 8).

Typically, a number of temperature sensors would be required to implement a thermal throttling scheme. These sensors would need to be integrated on the modem chip and would also need to be calibrated during production tests, adding complexity in the chip design, calibration, and test efforts. In addition, temperature sensors typically need special voltage levels for operation of their digital as well as analog circuitry. Power is therefore consumed during measurement windows by the sensor, triggering measurements by a processor and disturbing processor sleep cycles/states due increased wake up events. Embodiments of the present disclosure, however, may provide an approach on estimating temperature and managing thermal throttling without need of dedicated temperature sensor circuitry.

In addition, aspects of the present disclosure may also utilize statistical counts, magnitudes, and frequencies of detected supply voltage drops for throttling management. This may be advantageous, as voltage drops can be easily measured with high accuracy, and statistics related to the detected voltage drops can be easily integrated to throttling decision schemes. Moreover, supply voltage drops may provide good visibility into dynamic system activity, which can be recorded for learning user behaviors or increasing reliability for triggering throttling measures.

In some embodiments, one or more of the brownout predictor 110, voltage drop detector 116, chip temperature estimator 114, or throttling manager 112 is implemented in another portion of the mobile device 100 than shown in FIG.

1. Further, in some embodiments, the mobile device 100 may include additional or fewer components than those shown in FIG. 1.

Figure 2:
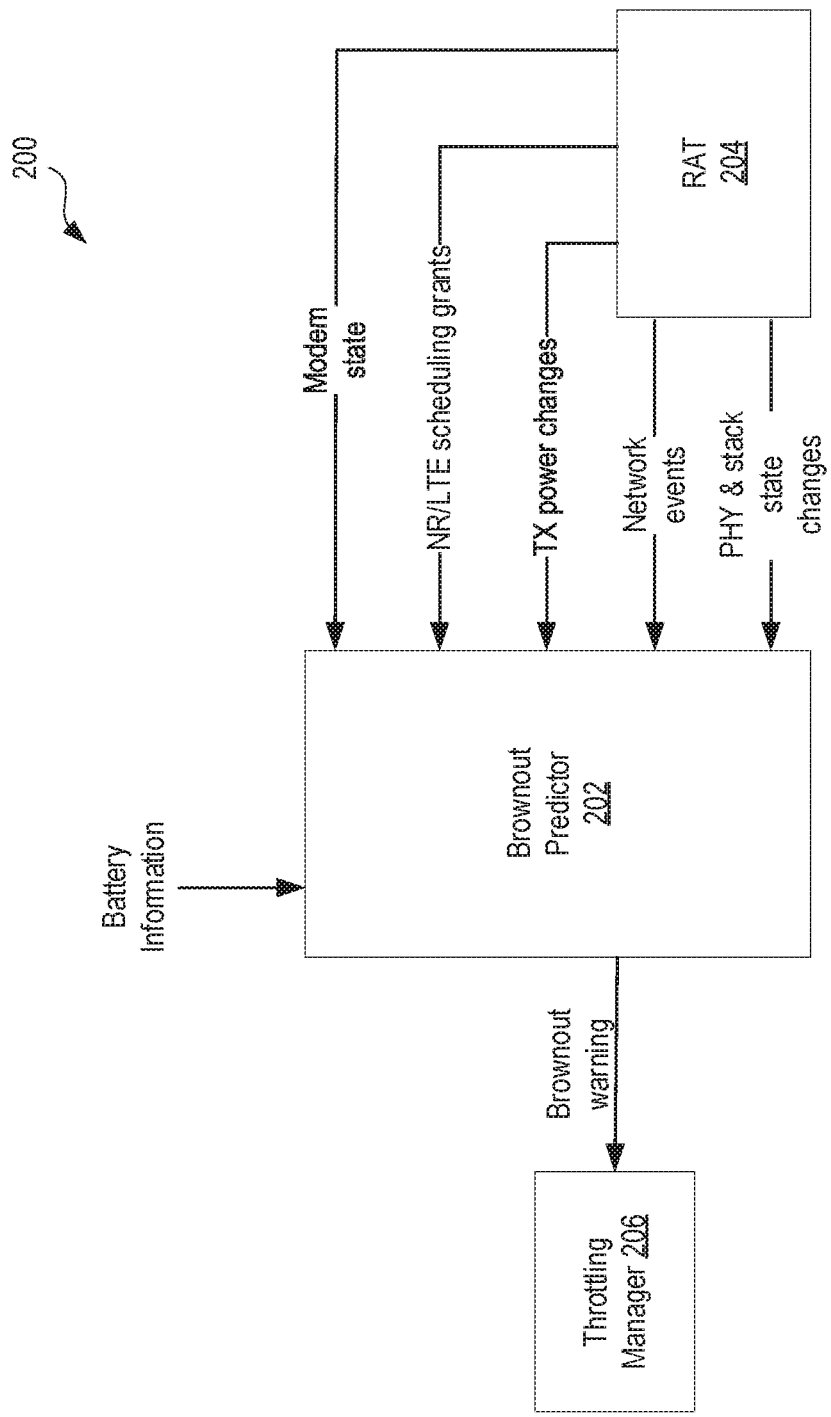
FIG. 2 is a diagram of an example brownout prediction-based throttling management system according to one embodiment.

FIG. 2 is a diagram of an example brownout prediction-based throttling management system 200 according to one embodiment. In a radio access technology (RAT) 204 (e.g., a 4G, 5G or other type of RAT), the modem may react to events from the network or the user (e.g. upon an RRC connection establishment request). A modem brownout may depend on the specific modem activities and activity switches triggered by these events (e.g. reception of DL packets). In some embodiments, the brownout predictor 202 distinguishes these activities during runtime and generates a brownout prediction by observing one or more modem parameters or characteristics, such as: an RRC state assigned to the mobile device (e.g. IDLE, CONNECTED), a number of component carriers assigned to the mobile device, a number of uplink and downlink scheduling grants, a change of number of NR/LTE scheduling grants to previous frame or frames, a transmit power level assignment, or a change in the transmit power level assignment. The brownout predictor 202 may use a weighted and filtered combination of these variables to dynamically determine a possible modem brownout scenario in advance, and issue a brownout warning in the event that a threshold certainty level is reached.

In the example shown, the brownout predictor 202 receives information from the RAT 204 regarding network traffic and scheduling and determines an estimated peak power consumption for the system 200 based on the information received. In some cases, the brownout predictor 202 also uses battery information obtained from a battery monitor (e.g., the battery monitor 118 of FIG. 1) to determine the estimated peak power consumption. In the example shown, for instance, the brownout predictor 202 receives modem state information, scheduling grant information, transmit power changes, network event information, and PHY/protocol stack state change information.

The brownout predictor 202 may use some or all of the information received to make a brownout prediction, which may be relayed to the throttling manager 206. The throttling manager 206 then executes, or initiates execution of, a throttling scheme to prevent the predicted brownout scenario. In some cases, the throttling manager 206 implements a time-based, reverse order scheme, as described below. The brownout predictor 202 and throttling manager 206 may each be implemented by hardware circuitry, firmware, software, or a combination thereof.

Figure 3:
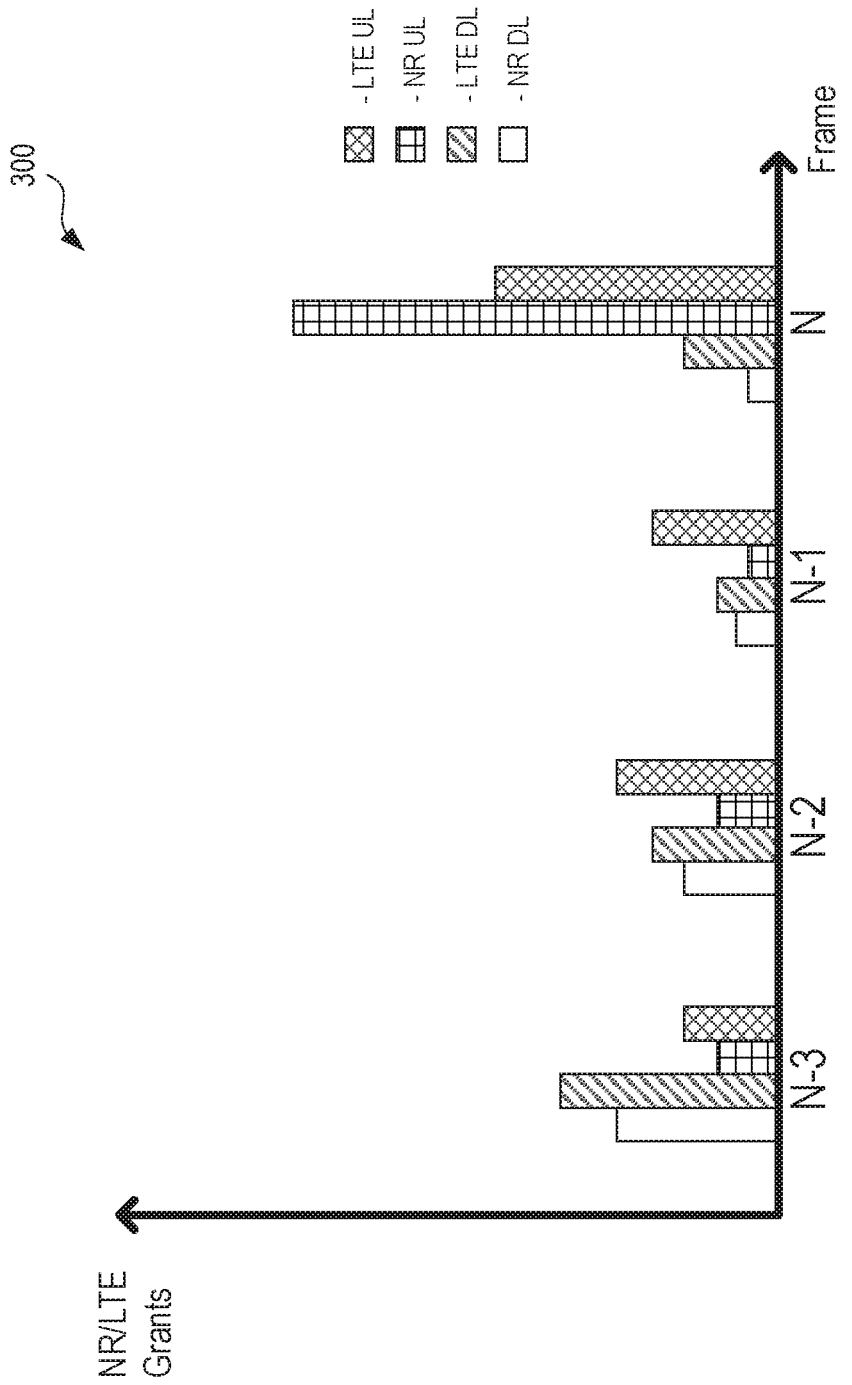
FIG. 3 is a chart of example scheduling grants for radios of a mobile device according to one embodiment.

FIG. 3 is a chart 300 of example scheduling grants for radios of a mobile device according to one embodiment. The chart 300 indicates a quantity of uplink and downlink scheduling grants for communication via both LTE and NR protocols for a sequence of four frames. In the example shown, the quantity of scheduling grants for the frame N is substantially increased from those of the three prior frames (N−1, N−2, N−3). An increase in scheduling grants may require additional resource utilization for a modem of a mobile device, which may in turn cause a decrease in a supply voltage for the modem and a potential brownout scenario. If the increase of resource utilization occurs rapidly, then a brownout scenario may be quite likely to occur. Accordingly, in certain embodiments, a brownout prediction may be made based on an increase in scheduling grants observed for a modem, and the brownout prediction may be used to execute a time-based, reverse order throttling scheme to prevent the potential brownout from occurring.

Figure 4:
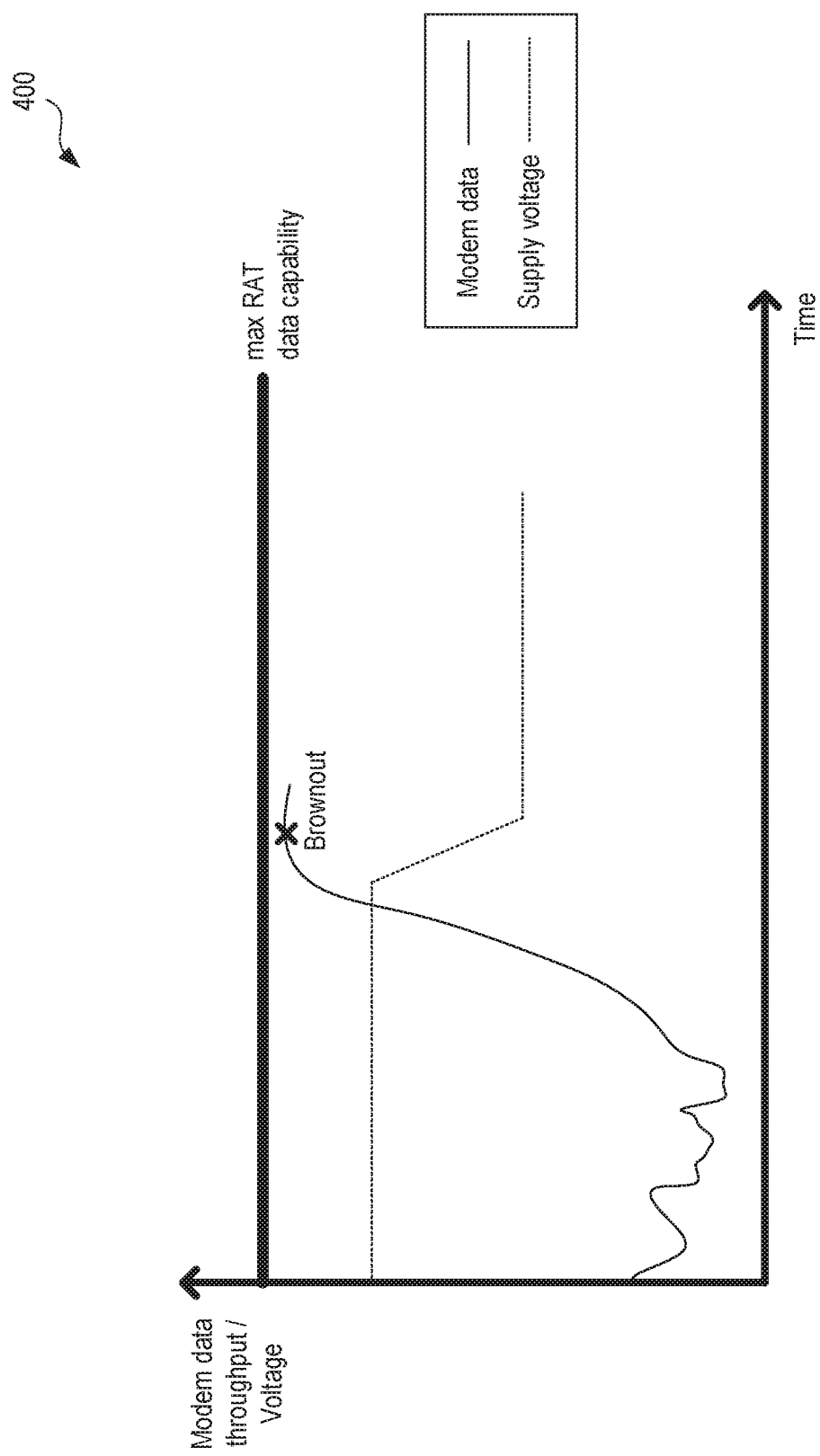
FIG. 4 is a chart showing an example brownout scenario according to one embodiment.

FIG. 4 is a chart 400 showing an example brownout scenario according to one embodiment. In the example shown, a modem is granted additional scheduling grants (e.g., similar to the scenario shown in FIG. 3) given to the modem by a network device (e.g., an eNodeB or another similar type of network device). As a result of the scheduling grants, modem data throughput is increased suddenly, causing a sudden drop in the modem supply voltage (due to the increased current in the modem from increased resource utilization). If the drop in the supply voltage is large enough, then a brownout occurs as shown. A brownout may refer to a shutdown of the modem caused by the decrease in supply voltage.

Figure 5:
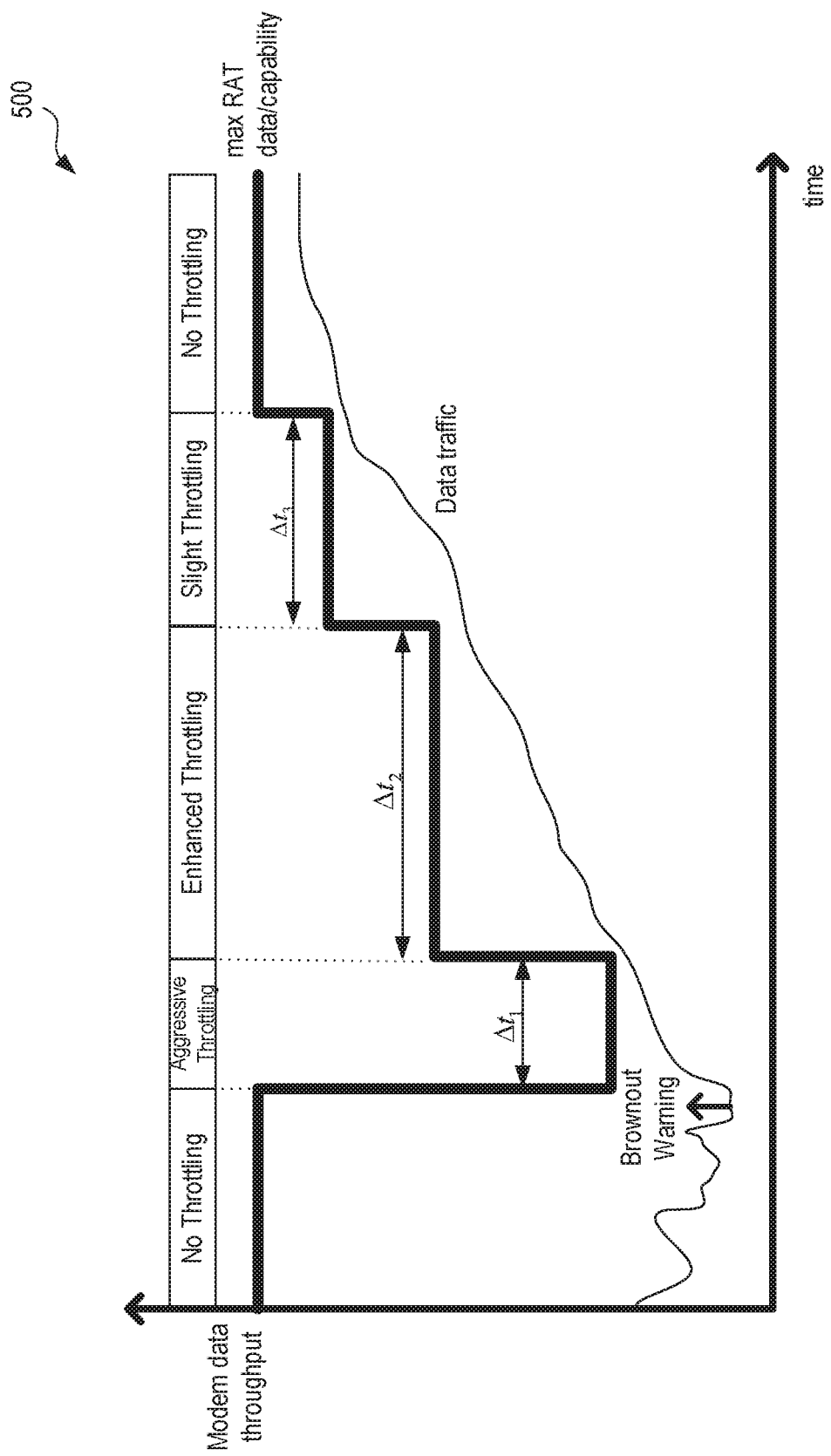
FIG. 5 is a chart showing an example implementation of a time-based reverse order throttling scheme for brownout prevention according to one embodiment.

FIG. 5 is a chart 500 showing an example implementation of a time-based reverse order throttling scheme for brownout prevention according to one embodiment. Like the example shown in FIG. 4, the modem is suddenly given additional scheduling grants by a network device. However, in the example shown in FIG. 5, a brownout warning is generated based on the additional scheduling grants, before the modem data throughput is realized, and the reverse order throttling scheme is implemented in response. In the example shown, the reverse order throttling scheme is tiered. Each tier indicates a different level of throttling for the modem, and is implemented for a particular time duration. Thus, each tier of the throttling scheme is activated after a particular amount of time has elapsed. For example, the second tier is activated after $\Delta t_1$, the third tier is activated after $\Delta t_1 + \Delta t_2$, and the fourth tier (e.g., no throttling) is activated after $\Delta t_1 + \Delta t_2 + \Delta t_3$.

Throttling may be most restrictive in the first tier, and each subsequent tier implements a less restrictive throttling. For instance, in the example shown, the first tier implements an aggressive throttling (most restrictive, e.g., limits RAT capabilities to ~40% of maximum while maintaining moderate throughput levels and connection to the network), the second tier implements enhanced throttling (less restrictive than the aggressive throttling, e.g., ~60% of maximum RAT capabilities of the device), the third tier implements slight throttling (less restrictive than the enhanced throttling, e.g., ~80% of maximum RAT capabilities of the device), and the fourth tier implements no throttling restrictions. Each throttling tier may be implemented by one or more of: reducing a data rate for the modem, reducing a number of component carriers available to the modem for communication, reducing a rank indication for the modem, or reducing a window size for a Transmission Control Protocol (TCP). In some instances, a power delivery unit of the mobile device (e.g. a power management unit (PMU)) can control the time durations between the tiers in real time, such as by using a control loop that has compensated a voltage drop. In such instances, the throttling level change may be given by triggers from the PMU.

FIG. 6 is a chart 600 of example characteristic curves for various modem chip temperatures according to one embodiment. In particular, the example chart 600 illustrates a relation between modem data throughput, which may be based on a number of modem parameters (e.g., those in the example table below), and expected chip temperatures. Characteristic curves like those shown in FIG. 6 may be used to populate entries in a lookup table. In some instances, the entries in the lookup table may relate an expected power at a reference temperature given a particular modem state, modem data rate, and number of component carriers. The lookup table may be formatted accordingly:

| Modem state | Modem data rate | Number of component carriers | Expected power @ reference temperature |
|---|---|---|---|
| ... | ... | ... | ... |

Learning the parameters to populate those shown above may be performed for each individual mobile device, since process variations that alter chip thermal characteristics for each device. Such variations may accordingly be covered in the lookup table and thus aid in the accuracy of the temperature estimation process. The expected power can then be indexed or otherwise accessed by measuring one or a combination of the lookup table parameters. Using the example above, an expected power may be defined by the following equation:

ExpectedPower=LUT(modem state,data rate,# component carriers).

An actual power may be measured, and a difference between the actual and expected power may be determined, such as by the following equation:

$\Delta P$=MeasuredPower−ExpectedPower.

The difference may be due to temperature variations to the chosen reference temperature. In some cases, another lookup table can be used to relate the calculated power difference $\Delta P$ to the expected temperature difference $\Delta T$ at various reference points. Such a lookup table may be formatted accordingly:

| $\Delta P$ | $\Delta T$ |
|---|---|
| ... | ... |

The chip temperature may then be estimated according to the following equation:

EstimatedTeperature=$\Delta T$+referenceTemperature.

By utilizing a temperature estimated process like the one described above modem power consumption may be improved and development process may be reduced. In addition, thermal sensor circuitry and their associated control tasks may be rendered unnecessary.

Figure 7:
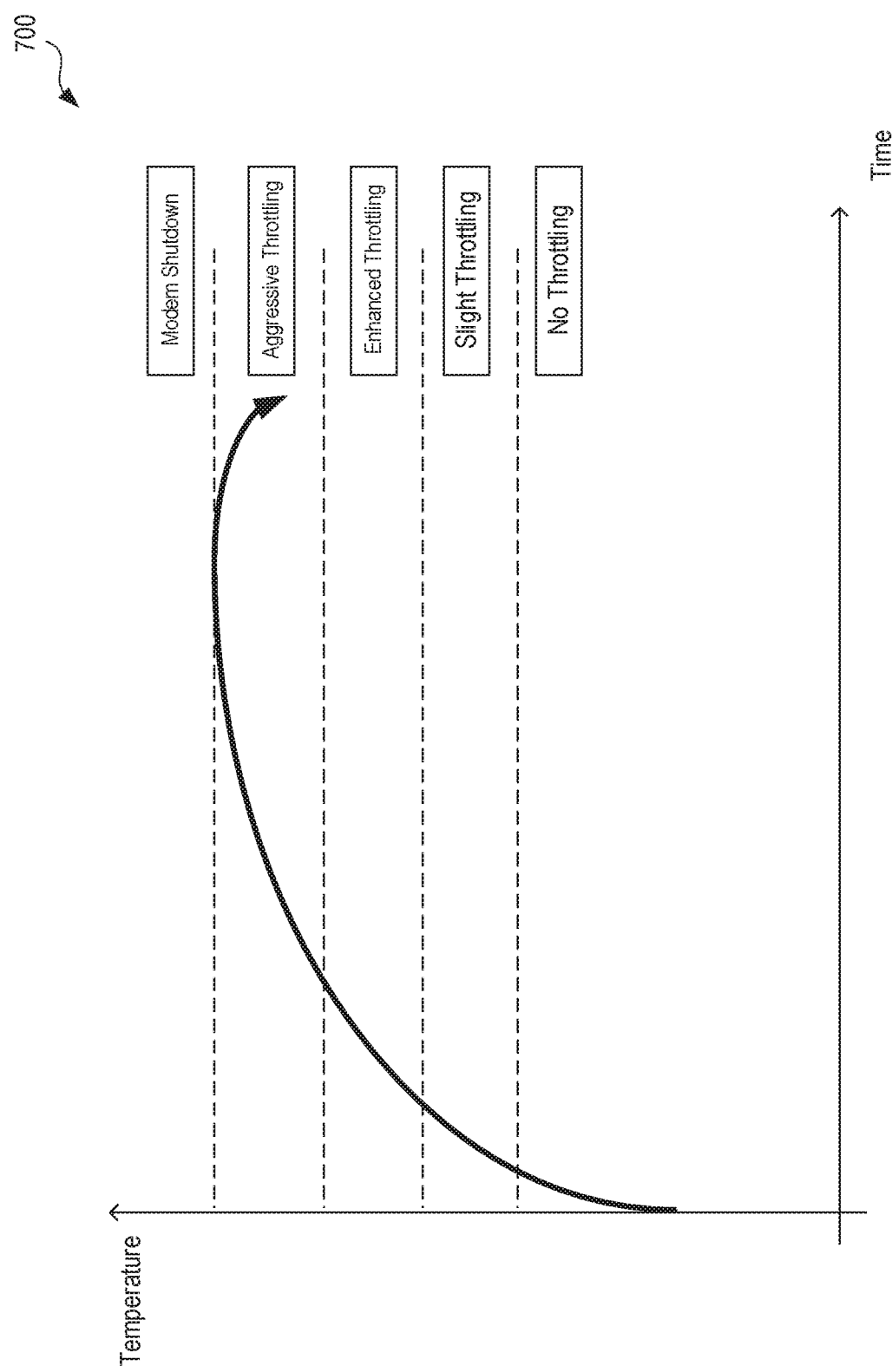
FIG. 7 is a chart showing an example throttling scheme based on an estimated chip temperature according to one embodiment.

FIG. 7 is a chart 700 showing an example throttling scheme based on an estimated chip temperature according to one embodiment. In the example shown, the throttling scheme gradually increases a level of throttling (e.g., reducing the modem's max data rate, blank transmit antenna path including power amplifiers, or reducing a number of component carriers used for bandwidth aggregation by NR/LTE) as the estimated temperature increases. The estimated chip temperature may be determined based on lookup tables that are based on characteristic curves for the device, as described above. In some cases, temperature severity and slope may determine the throttling level (i.e., no throttling, slight throttling, enhanced throttling, aggressive throttling, full throttling/shutdown). Each throttling level may contribute to power reduction of a different magnitude depending on radio conditions and may include earlier-activated throttling measures from lower levels along with additional throttling measures. This means that with a higher throttling level enabled, more chip energy limitation may be achieved, translating to a stronger passive cooling effect.

In some cases, a throttling scheme may utilize both an estimated chip temperature and supply voltage drop information to determine a level of throttling to apply. For instance, a frequency or magnitude of supply voltage drops (e.g., a number of drops over a time duration) may provide additional information for controlling a temperature of a modem. In some cases, supply voltage drop information may be regarded as an alternative to current measurements for predicting system temperature.

Figure 8A:
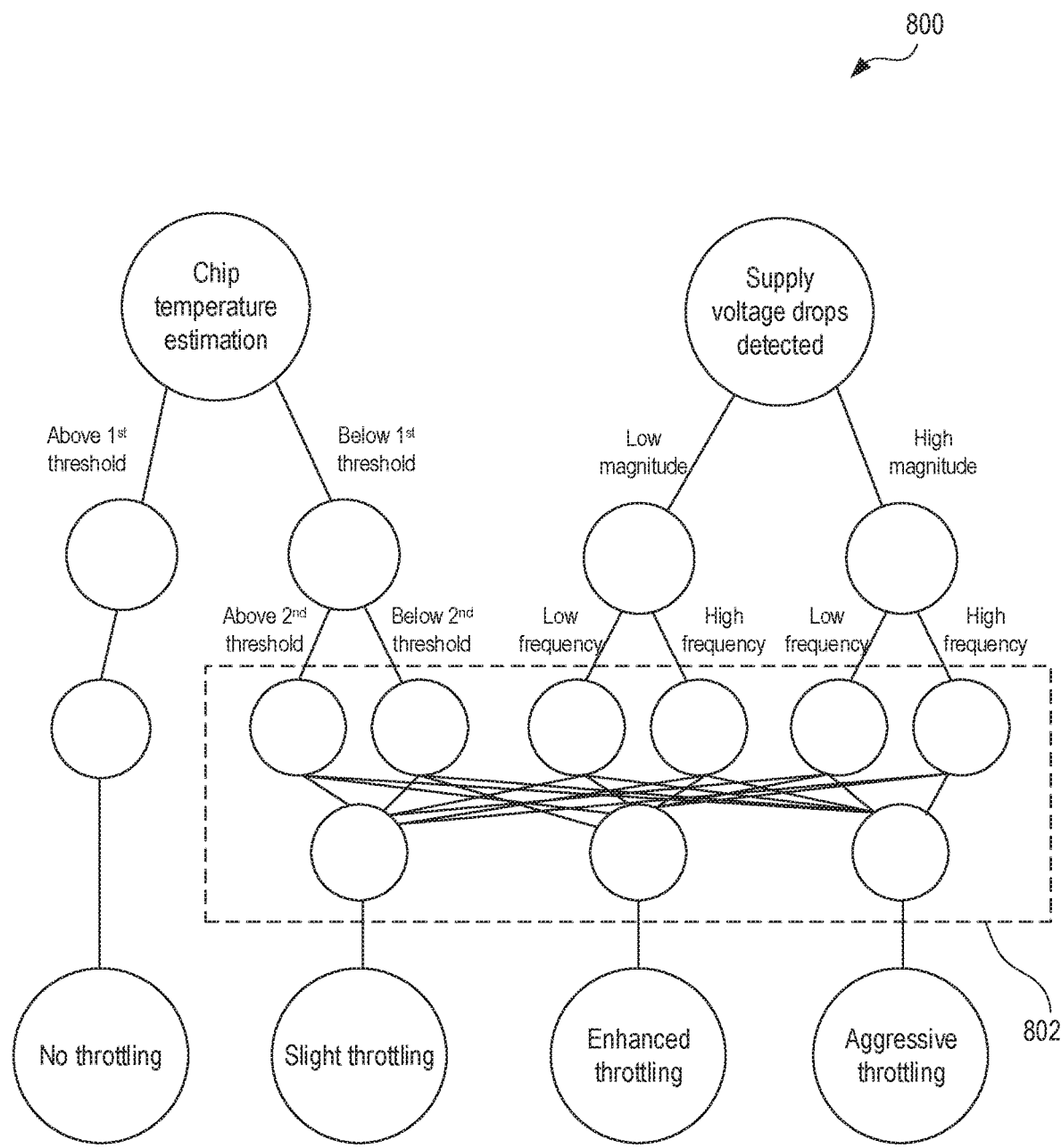
FIG. 8A is a diagram of an example decision tree for a throttling scheme based on estimated chip temperature and supply voltage drop information according to one embodiment.

FIG. 8A is a diagram of an example decision tree 800 for a throttling scheme based on estimated chip temperature and supply voltage drop information according to one embodiment. In the example shown, the decision tree 800 analyzes whether the chip temperature estimation is above/below a first and second threshold (where the second threshold is above the first threshold) and the magnitude and frequency of detected supply voltage drops to determine a level of throttling measures to execute on a modem. Aspects of the decision tree 800 may be customized based on observed patterns in device or user behavior, such as the portion 802 of the decision tree 800 (as described further below).

System load behaviors as well as the reported temperature response can be learned/trained, such that the system may recognize specific patterns early in advance that lead to critical temperature. For example, detection of low frequency but high magnitude voltage drops along with a high estimated chip temperature may indicate a system behavior that is likely to maintain high load (high current/power) and thus exceed certain temperature thresholds in the near future. Consequently, an appropriate throttling action/response can be selected.

In some instances, the magnitude of voltage drops can be based on the maximum voltage drop measured per device, which may allow the decision tree 800 to suit and interpret voltage drop measurements for each device individually, since electrical and physical characteristics tend to vary with process fabrication from device to device.

Figure 8B:
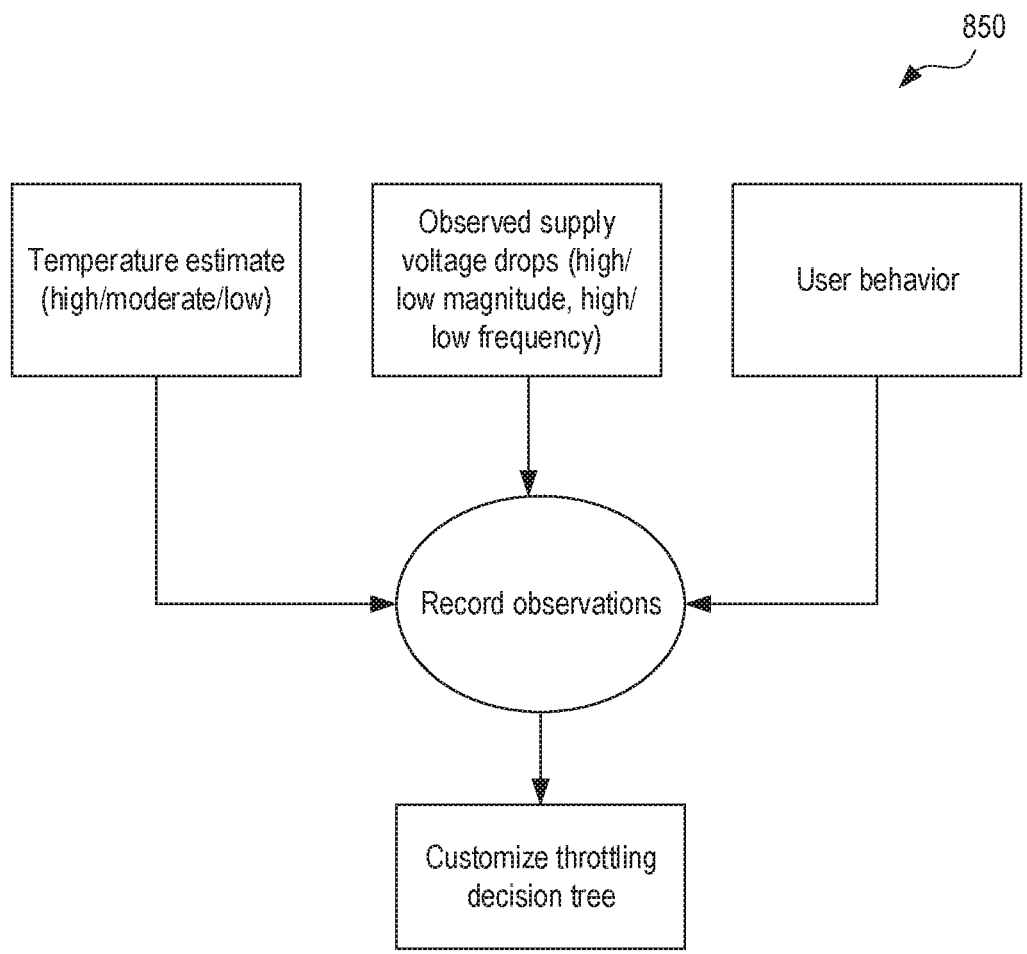
FIG. 8B is a diagram of an example decision tree customization algorithm for the decision tree of FIG. 8A.

FIG. 8B is a diagram of an example decision tree customization algorithm 850 for the decision tree 800 of FIG. 8A. The example algorithm may be used, in some instances, to configure or adjust the portion 802 of the decision tree 800 to account for user behaviors. In some cases, the portion 802 of the decision tree 800 may be configured by a machine learning algorithm that analyzes the temperature estimates, detected supply voltage drops, and user behavior over time. Supply voltage drops may provide real time visibility on system activity, enabling such learning algorithms to record temperature changes with observed supply voltage drop cycles or patterns. Statistical counts of high (e.g. 200 mV and higher) and low level (e.g. 50 mV and higher) voltage drops over an observation time interval (e.g., 5 seconds) may provide indications for user dependent temperature changes in the device. Recording this frequency information along with estimated changes of temperature allows the decision tree 800 to be customized to specific user behaviors (since every user shows repetitive pattern using/stressing its device) as well as to the specific device characteristics, since physical and electrical properties vary over fabrication process and each device may respond differently with respect to load and temperature.

Figure 9:
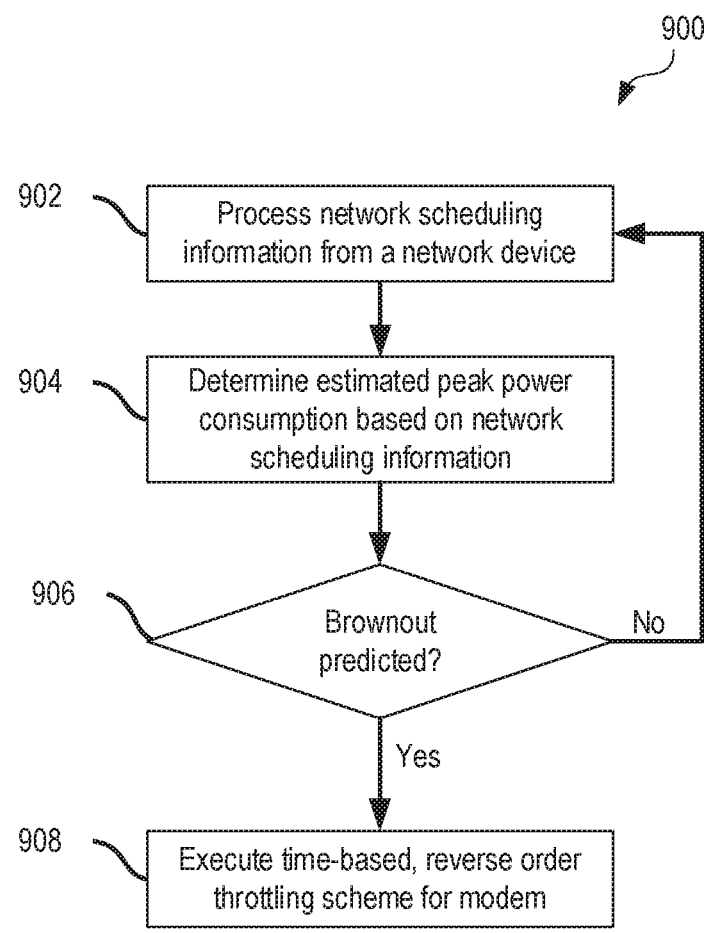
FIG. 9 is a flow diagram of an example process for implementing a throttling scheme based on network scheduling messages according to one embodiment.

FIG. 9 is a flow diagram of an example process for implementing a throttling scheme based on network scheduling messages according to one embodiment. Operations in the example process 900 may be performed by components of a mobile device (e.g., the processor 102 of mobile device 100 of FIG. 1). The example process 900 may include additional or different operations, and the operations may be performed in the order shown or in another order. In some cases, one or more of the operations shown in FIG. 9 are implemented as processes that include multiple operations, sub-processes, or other types of routines. In some cases, operations can be combined, performed in another order, performed in parallel, iterated, or otherwise repeated or performed another manner.

At 902, network scheduling information received from a network device is processed by a mobile device. The network scheduling information may be based on messages received by the mobile device that indicate the network scheduling information. In some cases, the scheduling information indicates an uplink scheduling grant for the mobile device, a downlink scheduling grant for the mobile device, a number of component carriers assigned to the mobile device, or a transmit power level assignment for the mobile device. In some instances, the network scheduling information is formatted according to a Radio Resource Control (RRC) protocol.

At 904, an estimated peak power consumption is determined based on the network scheduling information processed at 902. The estimated peak power consumption may be an estimate of the power needed to implement the network scheduling indicated by the network scheduling information processed at 902. For example, increased uplink scheduling grants or an increased transmit power level for the antenna of the mobile device may cause an increase in the amount of power and current consumed by the modem of a mobile device, which may lead to a drop in supply voltage and thus, a potential brownout.

At 906, a brownout prediction is made. The brownout prediction may be based on the estimated peak power consumption determined at 904, and may indicate a likelihood or confidence level of a brownout occurring in the mobile device given the network scheduling information processed at 902. In some cases, the brownout prediction is further based on one or more of: a battery capacity of the mobile device, battery aging information of the mobile device, and a battery temperature of the mobile device. In some cases, other device usage information is used in the brownout prediction, such as camera flash usage information.

If the brownout prediction indicates a high brownout potential, then at 908, a time-based reverse order throttling scheme for the modem is executed. The throttling scheme may be a tiered scheme, with each tier of the throttling scheme indicating a different throttling restriction level. Each tier may be activated based on an elapsed time since executing the throttling scheme. Each level of throttling may include one or more of reducing a data rate for the modem, reducing a number of component carriers available to the modem for communication, reducing a rank indication for the modem, and reducing a window size for a Transmission Control Protocol (TCP). In some cases, the throttling scheme is a reverse order throttling scheme, where each tier implements a less restrictive throttling than the prior tier. An example time-based throttling scheme is shown in FIG. 5, and described above. If the brownout prediction indicates a low brownout potential, then the process 900 may repeat.

Figure 10:
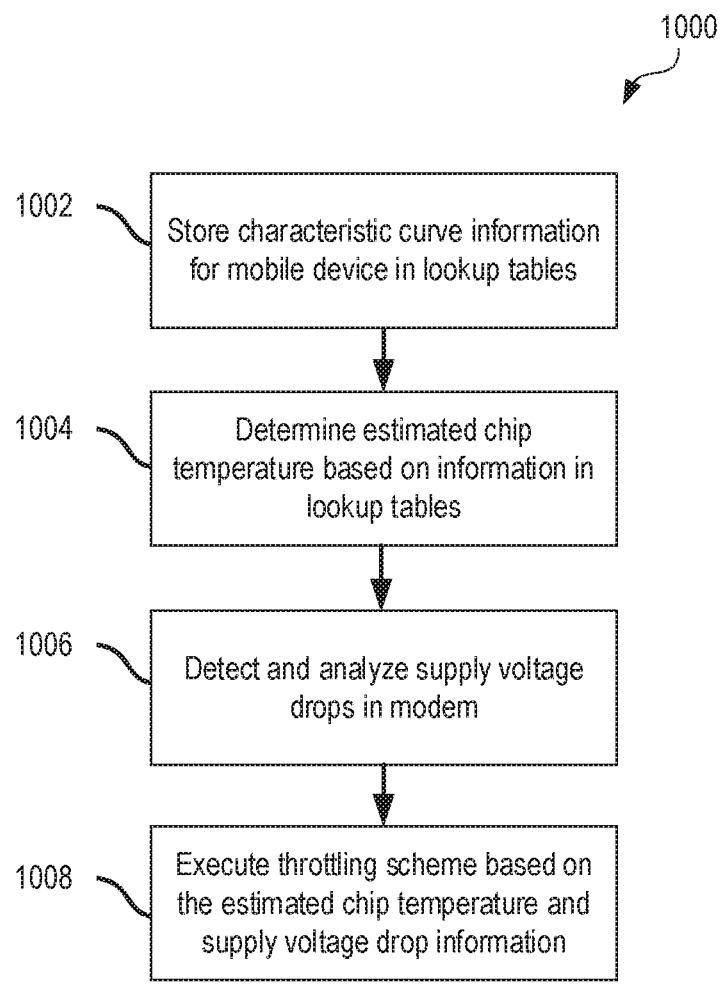
FIG. 10 is a flow diagram of an example process for implementing a throttling scheme based on an estimated chip temperature and detected supply voltage drops according to one embodiment.

FIG. 10 is a flow diagram of an example process for implementing a throttling scheme based on an estimated chip temperature and detected supply voltage drops according to one embodiment. Operations in the example process 1000 may be performed by components of a mobile device (e.g., the processor 102 of mobile device 100 of FIG. 1). The example process 1000 may include additional or different operations, and the operations may be performed in the order shown or in another order. In some cases, one or more of the operations shown in FIG. 10 are implemented as processes that include multiple operations, sub-processes, or other types of routines. In some cases, operations can be combined, performed in another order, performed in parallel, iterated, or otherwise repeated or performed another manner.

At 1002, characteristic curve information is stored in one or more lookup tables. The characteristic curve information may indicate expected chip temperatures associated with particular modem states or parameters, such as a modem power, modem state, modem data rate, or number of component carriers used or in use by the modem. For example, in some cases, the characteristic curves look similar to those shown in FIG. 7, and the information stored in the lookup tables looks similar to the table described above with respect to the same.

At 1004, an estimated chip temperature is determined based on information in the lookup tables. In some cases, this may include determining an expected power consumption based on the information in the lookup tables (e.g., by measuring one or a combination of the lookup table parameters), measuring an actual power consumption of the mobile device, and determining a difference between the actual and expected power. The difference may be due to temperature variations to the chosen reference temperature, and the chip temperature may thus be estimated based on the calculated power difference $\Delta P$ to the expected temperature difference $\Delta T$ at various reference points.

At 1006, supply voltage drops in the modem are detected and analyzed. In some cases, this may include determining statistical parameters of the detected supply voltage drops, such as, for example, a level or magnitude of the detected drops in the supply voltage or a number of voltage drops detected over a particular time duration (frequency of voltage drops detected).

At 1008, a throttling scheme is executed based on the estimated chip temperature determined at 1004 and the supply voltage drops detected and analyzed at 1006. In some cases, the throttling scheme may be based on a decision tree, such as the decision tree shown in FIG. 8A. The decision tree may analyze the magnitude and frequency of voltage drops detected along with the chip temperature estimations to determine a level of throttling measures to execute on a modem. In some cases, the mobile device may analyze (e.g., using machine learning algorithms) the observed voltage drops and estimated temperatures changes along with user behaviors in order to customize the throttling decision tree to the particular mobile device (e.g., as shown in FIG. 8B).

Functions, operations, components and/or features described herein with reference to one or more embodiments, may be combined with, or may be utilized in combination with, one or more other functions, operations, components and/or features described herein with reference to one or more other embodiments, or vice versa.

Examples

The following examples pertain to further embodiments. It will be understood that certain examples listed below may be combined with other examples, or certain aspects of other examples.

Example 1 includes an apparatus of a mobile device, the apparatus comprising: memory comprising instructions; and processing circuitry coupled to the memory to implement the instructions to: process messages from a network device indicating a scheduling of network traffic for the mobile device; determine an estimated peak power consumption associated with the scheduling of network traffic based on the messages; and execute a time-based throttling scheme for a modem of the mobile device based on the estimated peak power consumption.

Example 2 includes the subject matter of Example 1, and optionally, processing the messages from the network device comprises comparing the messages with previously-received messages from the network device indicating a previous scheduling of network traffic for the mobile device.

Example 3 includes the subject matter of Example 1, and optionally, wherein the throttling scheme is a tiered scheme, wherein each tier of the throttling scheme indicates a different throttling restriction and is activated based on an elapsed time since executing the throttling scheme.

Example 4 includes the subject matter of Example 3, and optionally, wherein each tier of the throttling scheme implements a less restrictive throttling than a prior tier of the throttling scheme.

Example 5 includes the subject matter of Example 1, and optionally, wherein executing the throttling scheme includes at least one of reducing a data rate for the modem, reducing a number of component carriers available to the modem for communication, reducing a rank indication for the modem, and reducing a window size for a Transmission Control Protocol (TCP).

Example 6 includes the subject matter of Example 1, and optionally, wherein the messages indicate at least one of an uplink scheduling grant for the mobile device, a downlink scheduling grant for the mobile device, a number of component carriers assigned to the mobile device, and a transmit power level assignment for the mobile device.

Example 7 includes the subject matter of Example 1, and optionally, wherein the messages include messages formatted according to a Radio Resource Control (RRC) protocol.

Example 8 includes the subject matter of Example 1, and optionally, wherein executing the throttling scheme is further based on at least one of a battery capacity of the mobile device, battery aging information of the mobile device, and a battery temperature of the mobile device.

Example 9 includes a non-transitory computer-readable medium comprising instructions that are, when executed by processing circuitry, to: process messages from a network device indicating a scheduling of network traffic for a mobile device; determine an estimated peak power consumption associated with the scheduling of network traffic based on the messages; and execute a time-based throttling scheme for a modem of the mobile device based on the estimated peak power consumption.

Example 10 includes the subject matter of Example 9, and optionally, wherein processing the messages from the network device comprises comparing the messages with previously-received messages from the network device indicating a previous scheduling of network traffic for the mobile device.

Example 11 includes the subject matter of Example 9, and optionally, wherein the throttling scheme is a tiered scheme, wherein each tier of the throttling scheme indicates a different throttling restriction and is activated based on an elapsed time since executing the throttling scheme.

Example 12 includes the subject matter of Example 11, and optionally, wherein each tier of the throttling scheme implements a less restrictive throttling than a prior tier of the throttling scheme.

Example 13 includes the subject matter of Example 9, and optionally, wherein executing the throttling scheme includes at least one of reducing a data rate for the modem, reducing a number of component carriers available to the modem for communication, reducing a rank indication for the modem, and reducing a window size for a Transmission Control Protocol (TCP).

Example 14 includes the subject matter of Example 9, and optionally, wherein the messages indicate at least one of an uplink scheduling grant for the mobile device, a downlink scheduling grant for the mobile device, a number of component carriers assigned to the mobile device, and a transmit power level assignment for the mobile device.

Example 15 includes the subject matter of Example 9, and optionally, wherein the messages include messages formatted according to a Radio Resource Control (RRC) protocol.

Example 16 includes the subject matter of Example 9, and optionally, wherein executing the throttling scheme is further based on at least one of a battery capacity of the mobile device, battery aging information of the mobile device, and a battery temperature of the mobile device.

Example 17 includes a method, comprising: processing messages from a network device indicating a scheduling of network traffic for the mobile device; determining an estimated peak power consumption associated with the scheduling of network traffic based on the messages; and executing a time-based throttling scheme for a modem of the mobile device based on the estimated peak power consumption.

Example 18 includes the subject matter of Example 17, and optionally, wherein processing the messages from the network device comprises comparing the messages with previously-received messages from the network device indicating a previous scheduling of network traffic for the mobile device.

Example 19 includes the subject matter of Example 17, and optionally, wherein the throttling scheme is a tiered scheme, wherein each tier of the throttling scheme indicates a different throttling restriction and is activated based on an elapsed time since executing the throttling scheme.

Example 20 includes the subject matter of Example 19, and optionally, wherein each tier of the throttling scheme implements a less restrictive throttling than a prior tier of the throttling scheme.

Example 21 includes the subject matter of Example 17, and optionally, wherein executing the throttling scheme includes at least one of reducing a data rate for the modem, reducing a number of component carriers available to the modem for communication, reducing a rank indication for the modem, and reducing a window size for a Transmission Control Protocol (TCP).

Example 22 includes the subject matter of Example 17, and optionally, wherein the messages indicate at least one of an uplink scheduling grant for the mobile device, a downlink scheduling grant for the mobile device, a number of component carriers assigned to the mobile device, and a transmit power level assignment for the mobile device.

Example 23 includes the subject matter of Example 17, and optionally, wherein the messages include messages formatted according to a Radio Resource Control (RRC) protocol.

Example 24 includes the subject matter of Example 17, and optionally, wherein executing the throttling scheme is further based on at least one of a battery capacity of the mobile device, battery aging information of the mobile device, and a battery temperature of the mobile device.

Example 25 includes a system, comprising: means for processing messages from a network device indicating a scheduling of network traffic for the mobile device; means for determining an estimated peak power consumption associated with the scheduling of network traffic based on the messages; and means for executing a time-based throttling scheme for a modem of the mobile device based on the estimated peak power consumption.

Example 26 includes the subject matter of Example 25, and optionally, further comprising means for comparing the messages with previously-received messages from the network device indicating a previous scheduling of network traffic for the mobile device.

Example 27 includes an apparatus of a mobile device, the apparatus comprising: memory comprising instructions; and processing circuitry coupled to the memory to implement the instructions to: determine an estimated chip temperature based on information in a lookup table, the information based on characteristic curves for the mobile device indicating expected chip temperatures associated with particular modem states; detect a drop in a supply voltage for the modem; and execute a throttling scheme for a modem of the mobile device based on the estimated chip temperature and the detected drop in the supply voltage.

Example 28 includes the subject matter of Example 27, and optionally, wherein the modem state includes at least one of an amount of power consumption by the modem, a data rate of the modem, and a number of component carriers used by the modem.

Example 28 includes the subject matter of Example 27, and optionally, wherein executing the throttling scheme is based on at least one of a level of the detected drop in the supply voltage and a number of voltage drop detection over a time duration.

Example 30 includes a non-transitory computer-readable medium comprising instructions that are, when executed by processing circuitry, to: determine an estimated chip temperature based on information in a lookup table, the information based on characteristic curves for the mobile device indicating expected chip temperatures associated with particular modem states; detect a drop in a supply voltage for the modem; and execute a throttling scheme for a modem of the mobile device based on the estimated chip temperature and the detected drop in the supply voltage.

Example 31 includes the subject matter of Example 30, and optionally, wherein the modem state includes at least one of an amount of power consumption by the modem, a data rate of the modem, and a number of component carriers used by the modem.

Example 32 includes the subject matter of Example 30, and optionally, wherein executing the throttling scheme is based on at least one of a level of the detected drop in the supply voltage and a number of voltage drop detection over a time duration.

Example 33 includes a method, comprising: determining an estimated chip temperature based on information in a lookup table, the information based on characteristic curves for the mobile device indicating expected chip temperatures associated with particular modem states; detecting a drop in a supply voltage for the modem; and executing a throttling scheme for a modem of the mobile device based on the estimated chip temperature and the detected drop in the supply voltage.

Example 34 includes the subject matter of Example 33, and optionally, wherein the modem state includes at least one of an amount of power consumption by the modem, a data rate of the modem, and a number of component carriers used by the modem.

Example 35 includes the subject matter of Example 33, and optionally, wherein executing the throttling scheme is based on at least one of a level of the detected drop in the supply voltage and a number of voltage drop detection over a time duration.

Example 36 includes a system, comprising: means for determining an estimated chip temperature based on information in a lookup table, the information based on characteristic curves for the mobile device indicating expected chip temperatures associated with particular modem states; means for detecting a drop in a supply voltage for the modem; and means for executing a throttling scheme for a modem of the mobile device based on the estimated chip temperature and the detected drop in the supply voltage.

Example 37 includes the subject matter of Example 1, and optionally, wherein the processing circuitry is further to determine a likelihood of a brownout event based on the peak power consumption, and executing the throttling scheme is based on the determined likelihood of the brownout event.

Example 38 includes the subject matter of Example 37, and optionally, wherein determining the likelihood of the brownout event includes determining a confidence level associated with the brownout event occurring.

Example 39 includes the subject matter of Example 9, and optionally, wherein the instructions are further to determine a likelihood of a brownout event based on the peak power consumption, and executing the throttling scheme is based on the determined likelihood of the brownout event.

Example 40 includes the subject matter of Example 39, and optionally, wherein determining the likelihood of the brownout event includes determining a confidence level associated with the brownout event occurring.

Example 41 includes the subject matter of Example 17, and optionally, further comprising determining a likelihood of a brownout event based on the peak power consumption, wherein executing the throttling scheme is based on the determined likelihood of the brownout event.

Example 42 includes the subject matter of Example 41, and optionally, wherein determining the likelihood of the brownout event includes determining a confidence level associated with the brownout event occurring.

Example 43 includes the subject matter of Example 27, and optionally, wherein executing the throttling scheme is based on a comparison between at least one of a level of the detected drop in the supply voltage, a number of voltage drops detected over a time duration, and a recorded voltage drop profile that includes previous temperature impacts based on observed voltage drops.

Example 44 includes the subject matter of Example 27, and optionally, wherein the processing circuitry is further to record detected voltage drops and estimated temperatures over time intervals, and determine an expected temperature change for later-detected voltage drops based on the recorded voltage drops and estimated temperatures.

Example 45 includes the subject matter of Example 30, and optionally, wherein executing the throttling scheme is based on a comparison between at least one of a level of the detected drop in the supply voltage, a number of voltage drops detected over a time duration, and a recorded voltage drop profile that includes previous temperature impacts based on observed voltage drops.

Example 46 includes the subject matter of Example 30, and optionally, wherein the instructions are further to record detected voltage drops and estimated temperatures over time intervals, and determine an expected temperature change for later-detected voltage drops based on the recorded voltage drops and estimated temperatures.

Example 47 includes the subject matter of Example 33, and optionally, wherein executing the throttling scheme is based on a comparison between at least one of a level of the detected drop in the supply voltage, a number of voltage drops detected over a time duration, and a recorded voltage drop profile that includes previous temperature impacts based on observed voltage drops.

Example 48 includes the subject matter of Example 33, and optionally, further comprising recording detected voltage drops and estimated temperatures over time intervals, and determining an expected temperature change for later-detected voltage drops based on the recorded voltage drops and estimated temperatures.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a mobile device, the apparatus comprising:
   memory comprising instructions; and
   processing circuitry coupled to the memory to implement the instructions to:
      process messages from a network device indicating a scheduling of network traffic for the mobile device;
      determine a likelihood of a brownout event occurring in the mobile device based on the messages; and
      execute a throttling scheme based on the determined likelihood of the brownout event.

2. The apparatus of claim 1, wherein determining the likelihood of the brownout event includes determining a confidence level associated with the brownout event occurring, and executing the throttling scheme is based on the confidence level being greater than a threshold value.

3. The apparatus of claim 1, wherein the determined likelihood of a brownout event occurring in the mobile device is based on a comparison of the messages with previously-received messages from the network device indicating a previous scheduling of network traffic for the mobile device.

4. The apparatus of claim 1, wherein the determined likelihood of a brownout event occurring in the mobile device is based on battery status information for a battery of the mobile device.

5. The apparatus of claim 4, wherein the battery status information includes one or more of a current battery capacity, a battery aging status, and a battery temperature.

6. The apparatus of claim 1, wherein the determined likelihood of a brownout event occurring in the mobile device is based on camera status information indicating usage of a camera of the mobile device.

7. The apparatus of claim 1, wherein the throttling scheme is a tiered scheme, each tier of the throttling scheme indicates a different throttling restriction and is activated based on an elapsed time since executing the throttling scheme, and each tier of the throttling scheme implements a less restrictive throttling than a prior tier of the throttling scheme.

8. The apparatus of claim 1, wherein executing the throttling scheme includes at least one of reducing a data rate for the modem, reducing a number of component carriers available to the modem for communication, reducing a rank indication for the modem, and reducing a window size for a Transmission Control Protocol (TCP).

9. The apparatus of claim 1, wherein the messages indicate at least one of an uplink scheduling grant for the mobile device, a downlink scheduling grant for the mobile device, a number of component carriers assigned to the mobile device, and a transmit power level assignment for the mobile device.

10. A non-transitory computer-readable medium comprising instructions that are, when executed by processing circuitry, to:
    process messages from a network device indicating a scheduling of network traffic for a mobile device;
    determine a likelihood of a brownout event occurring in the mobile device based on the messages; and
    execute a throttling scheme for the mobile device based on the determined likelihood of the brownout event.

11. The non-transitory computer-readable medium of claim 10, wherein determining the likelihood of the brownout event includes determining a confidence level associated with the brownout event occurring, and executing the throttling scheme is based on the confidence level being greater than a threshold value.

12. The non-transitory computer-readable medium of claim 10, wherein the determined likelihood of a brownout event occurring in the mobile device is based on a comparison of the messages with previously-received messages from the network device indicating a previous scheduling of network traffic for the mobile device.

13. The non-transitory computer-readable medium of claim 10, wherein the determined likelihood of a brownout event occurring in the mobile device is based on battery status information for a battery of the mobile device.

14. The non-transitory computer-readable medium of claim 13, wherein the battery status information includes one or more of a current battery capacity, a battery aging status, and a battery temperature.

15. The non-transitory computer-readable medium of claim 10, wherein the determined likelihood of a brownout event occurring in the mobile device is based on camera status information indicating usage of a camera of the mobile device.

16. The non-transitory computer-readable medium of claim 10, wherein the throttling scheme is a tiered scheme, each tier of the throttling scheme indicates a different throttling restriction and is activated based on an elapsed time since executing the throttling scheme, and each tier of the throttling scheme implements a less restrictive throttling than a prior tier of the throttling scheme.

17. The non-transitory computer-readable medium of claim 10, wherein executing the throttling scheme includes at least one of reducing a data rate for the modem, reducing a number of component carriers available to the modem for communication, reducing a rank indication for the modem, and reducing a window size for a Transmission Control Protocol (TCP).

18. The non-transitory computer-readable medium of claim 10, wherein the messages indicate at least one of an uplink scheduling grant for the mobile device, a downlink scheduling grant for the mobile device, a number of component carriers assigned to the mobile device, and a transmit power level assignment for the mobile device.

* * * * *